United States Patent [19]
Akoshima et al.

[11] Patent Number: 5,052,742
[45] Date of Patent: Oct. 1, 1991

[54] COWLSIDE JOINT STRUCTURE FOR USE WITH VEHICLE

[75] Inventors: Shigeru Akoshima, Toyota; Ogawa Hisashi, Okazaki, both of Japan

[73] Assignee: Toyota Jidosha Kabushiki Kaisha, Toyota, Japan

[21] Appl. No.: 545,627

[22] Filed: Jun. 29, 1990

[30] Foreign Application Priority Data

| Jun. 30, 1989 | [JP] | Japan | 1-169361 |
| Jul. 11, 1989 | [JP] | Japan | 1-178237 |
| Jul. 13, 1989 | [JP] | Japan | 1-82612[U] |
| Jul. 13, 1989 | [JP] | Japan | 1-82613[U] |

[51] Int. Cl.$^5$ .......................................... B62D 25/08
[52] U.S. Cl. .................................... 296/192; 296/194
[58] Field of Search ................... 296/29, 192, 194, 203

[56] References Cited

U.S. PATENT DOCUMENTS

| 4,699,419 | 10/1987 | Kawase et al. |  |
| 4,886,314 | 12/1989 | Maeda | 296/192 |
| 4,964,672 | 10/1990 | Fuji | 296/192 |

FOREIGN PATENT DOCUMENTS

| 61-75376 | 5/1986 | Japan . |
| 61-75377 | 5/1986 | Japan . |
| 61-109873 | 7/1986 | Japan . |

*Primary Examiner*—Johnny D. Cherry
*Assistant Examiner*—Joseph D. Pape
*Attorney, Agent, or Firm*—Cushman, Darby & Cushman

[57] ABSTRACT

Disclosed herein is an cowlside joint structure which is suitable for use on a vehicle. In the cowlside joint structure, respective flanges of a cowlside panel, an upper member and a front pillar are formed along the longitudinal direction of the vehicle and then joined together. The cowlside panel, the upper member and the front pillar are provided in a linear form without providing a cut-away portion. Accordingly, rigidity in the area where various structures are connected to the cowlside panel is improved.

20 Claims, 6 Drawing Sheets

COWLSIDE JOINT STRUCTURE FOR USE WITH VEHICLE

BACKGROUND OF THE INVENTION

1) Field of the Invention

The present invention relates to a cowlside joint structure for use on a vehicle.

2) Description of the Related Art

As a conventional cowlside joint structure for use on a vehicle, has been described in Japanese Utility Model Application Laid-Open No. 61-75377.

This cowlside joint structure is constructed as shown in FIG. 6. The cowl topside 112 defined in the form of a closed rectangular cross-section running the length, (the longitudinal direction) of the vehicle, at right angles to the end of a cowl inner member 110, which is formed outwardly to run at right angles to the length of a vehicle, i.e., outwardly with respect to a transverse direction of the length of the vehicle. A front pillar 116 and an apron upper member 114 which has been offset by a predetermined dimension from the front pillar 116 are spot welded to the cowl topside 112 so as to form an integrally joined member.

However, with this cowlside joint structure, a folded portion 112A is formed at a portion where the cowl topside 112 is connected or joined to the apron upper member 114 of the cowl topside 112, whereas no flange is formed at a portion where the cowl topside 112 is joined to the front pillar 116 of the cowl topside 112. This structure therefore has the problem that rigidity between the front pillar 116 and the spring support 118 is low.

The prior art related to the present invention has been disclosed in Japanese Utility Model Application Laid-Open Nos. 61-75376 and 61-109873.

SUMMARY OF THE INVENTION

With the foregoing problem in view, it is thus an object of the present invention to provide a cowlside joint structure which improves rigidity where the front pillar and the spring support are joined together.

According to one aspect of the present invention, there is provided a cowlside joint structure, which comprises a cowlside panel disposed at the outer end of a cowl of a vehicle. The cowlside panel includes a first flange formed along the upper edge of the cowlside panel, and substantially parallel to the longitudinal axis of the vehicle, by bending said upper edge of said cowlside panel transversely inward towards the longitudinal center of the vehicle. The cowlside joint structure also comprises an upper member disposed at the outer end of the cowl of the vehicle, the upper member including a second flange formed along the length of the upper member by bending the upper edge thereof transversely inward towards the longitudinal center of the vehicle. The second flange lies substantially in line with the first flange of said cowlside panel. The cowlside joint structure has a front pillar disposed substantially vertically on the outer side of the cowlside panel, the front pillar including a third flange formed by bending an edge of an upper inclined portion transversely inward towards the center of the vehicle so that the third flange lies substantially in line with the first and second flanges. The first, second and third flanges are all fixedly joined together.

According to the present invention having the above-described construction, the cowlside panel, the upper member and each of the first, second and third flanges for the front pillar are all formed to run the length of the vehicle. A cut-away portion or folded portion on which stress is concentrated therefore does not occur in a portion where these flanges are joined together.

Accordingly, rigidity in the portion where the cowlside panel, the upper member and the front pillar are joined together is improved, thus enhancing rigidity between the front pillar and the spring support.

The above and other objects, features and advantages of the present invention will become apparent from the following description and the appended claims, taken in conjunction with the accompanying drawings in which an illustration of a preferred embodiment of the present invention is shown.

DETAILED DESCRIPTION OF THE PREFERRED EMBODIMENTS

Figure 1:
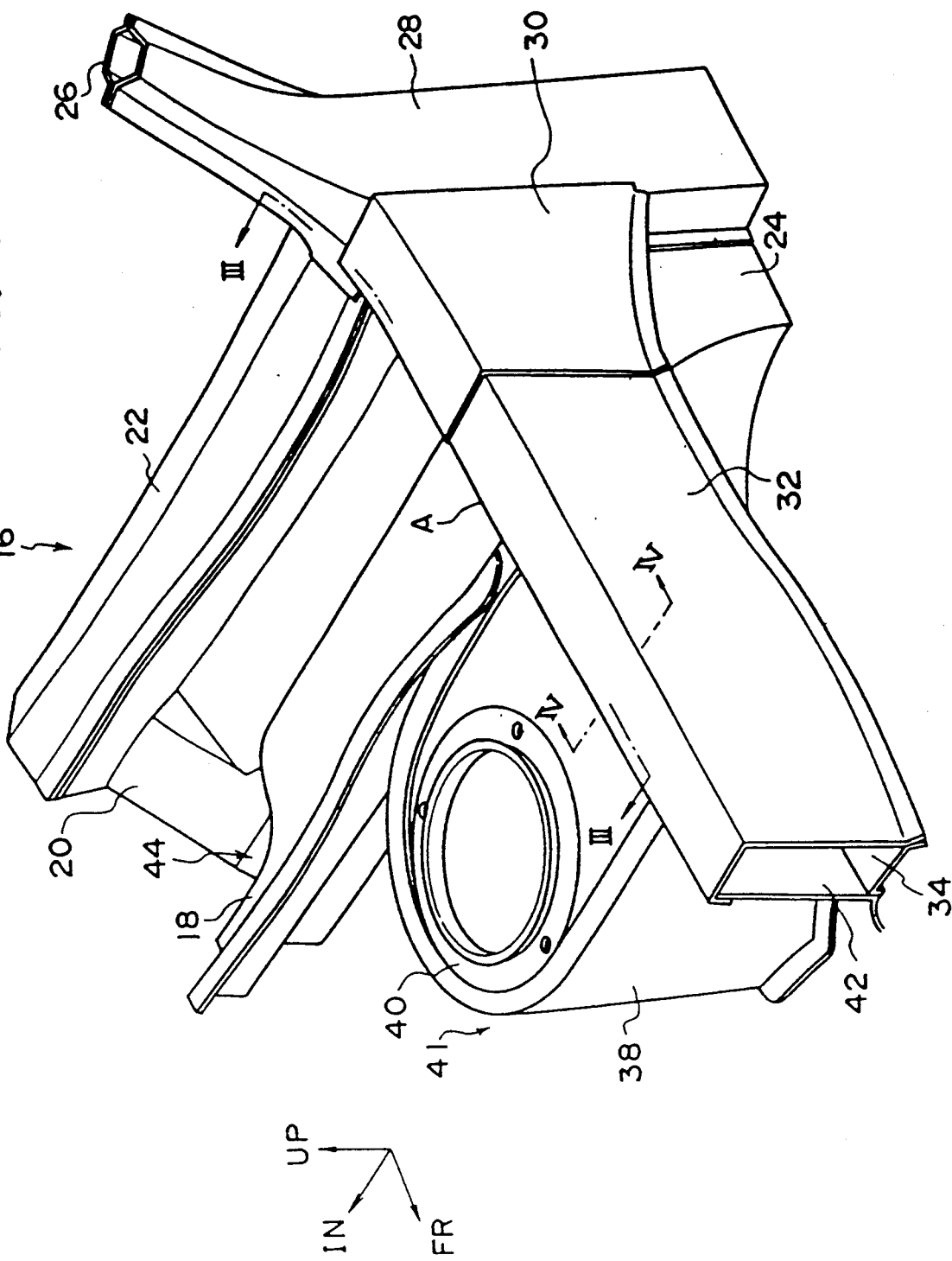
FIG. 1 is a perspective view showing a cowlside joint structure according to one embodiment of the present invention, as diagonally seen from the left-side front of a vehicle.

One embodiment of a cowlside joint structure according to the present invention will be described with reference to FIGS. 1 through 5.

In the drawings, symbol FR indicated by the arrow indicates the front of the vehicle, symbol IN indicated by the arrow indicates the inner direction thereof, and symbol UP indicates the upper direction thereof.

Figure 5:
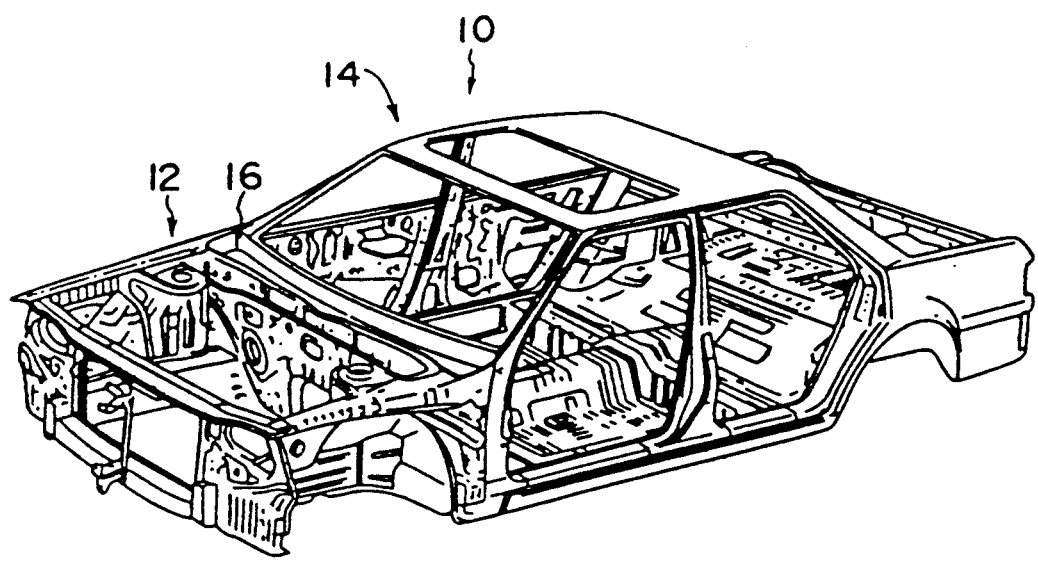
FIG. 5 is a schematic perspective view showing the vehicle body to which the cowlside joint structure according to the present invention is applied.
Figure 6:
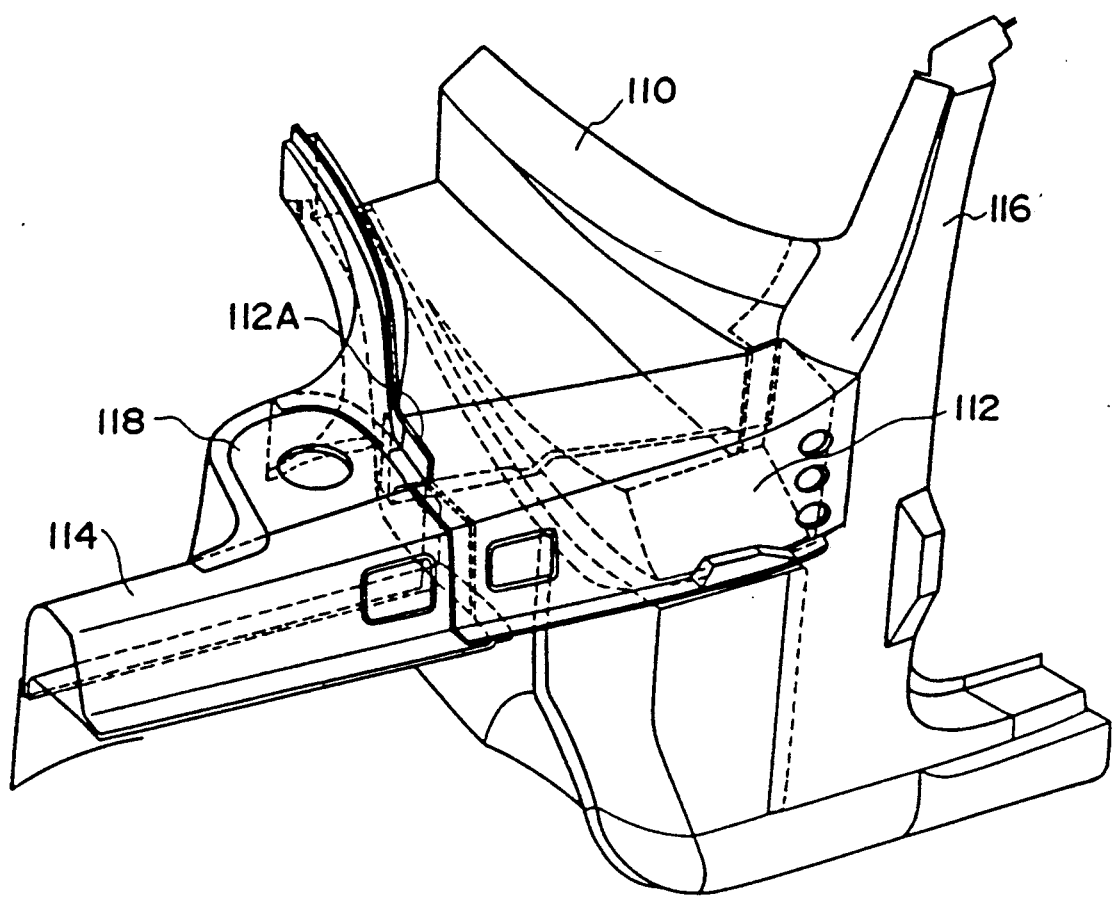
FIG. 6 is a perspective view depicting a conventional cowlside joint structure.

As shown in FIG. 5, an opening cowl 16 is arranged transversely to the length of the vehicle at a point where the body front 12, the vehicle body 10 and the main body 14 thereof are joined together.

Figure 2:
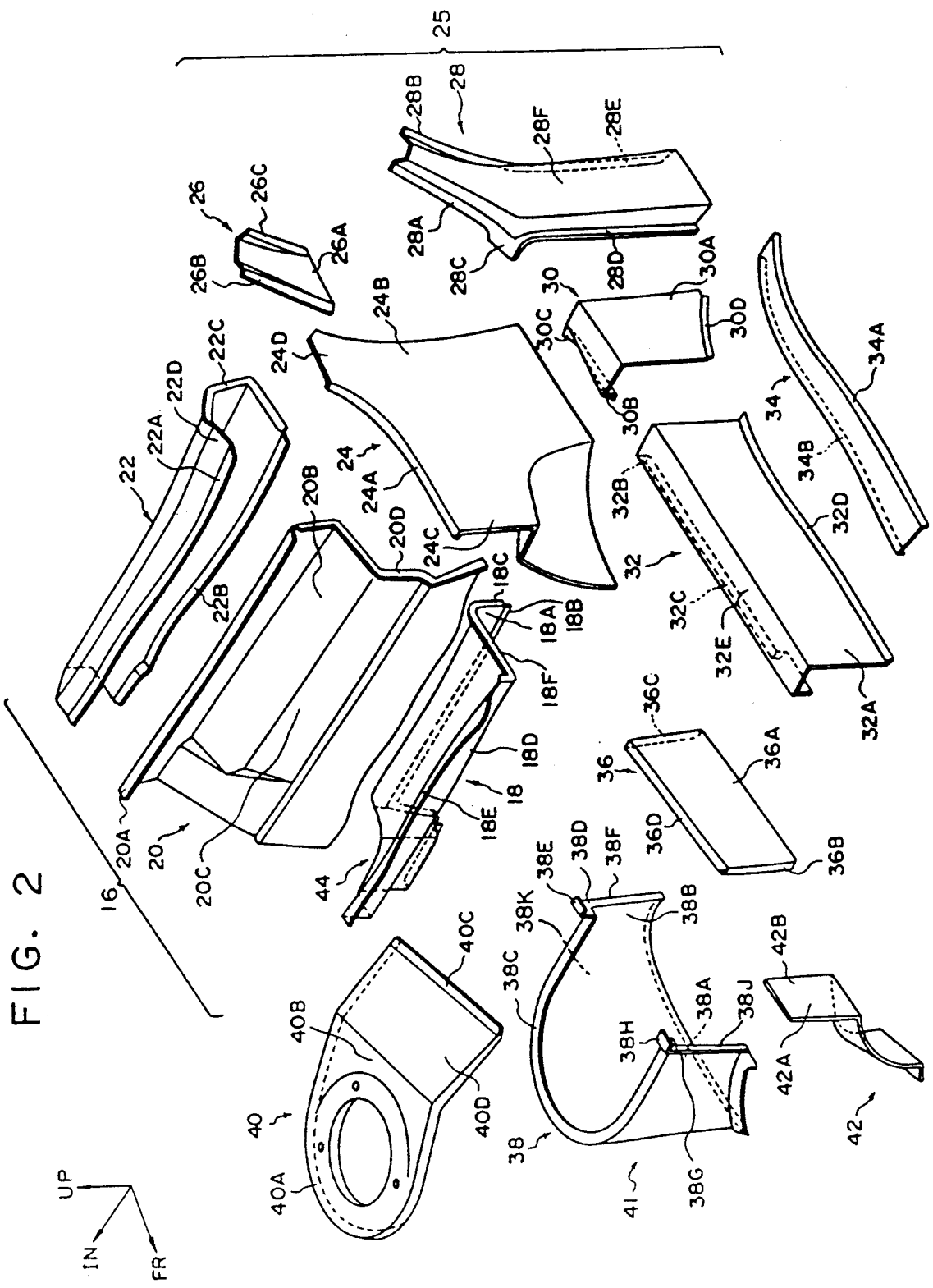
FIG. 2 is an exploded perspective view of the cowlside joint structure shown in FIG. 1.

As illustrated in FIGS. 1 and 2, the opening cowl 16 comprises a cowl front member 18, a cowl rear member 20 and a cowl reinforcement 22 provided at the rear side of the cowl rear member 20 in parallel therewith. The cowl rear member 20 and the cowl reinforcement 22 form a closed cross-section in structure. In other words, the configuration in cross-section of the cowl reinforcement 22 as seen from the transverse direction at the front of the vehicle is a substantially inverted U shape defining an opening of the cowl reinforcement 22 directed to the front of the vehicle. Distal end portions of the opening extend in the front direction of the vehicle to form an upper flange 22A and a lower flange 22B.

The upper flange 22A is welded, from the upper side of the cowl rear member 20, onto a flange 20A formed in an upper end portion of the cowl rear member 20 toward the front of the vehicle. In addition, a portion adjacent to the center portion of the cowl rear member 20 is bent to the front of the vehicle to form a bent portion 20B. The lower flange 22B of the cowl reinforcement 22 is welded, from the lower side of the bent portion 20B, to a rear end portion thereof. Accordingly, the opening of the cowl reinforcement 22 is closed by means of the cowl rear member 20. Hence the cowl rear member 20 and the cowl reinforcement 22 define a closed cross-section in structure.

A front end of the bent portion 20B of the cowl rear member 20 is bent downwards to form a bent portion 20C. At the upper end portion of the bent portion 20C a flange 18B, which extends downwards at a lower end portion of a rear side wall 18A of the cowl front member 18, is welded to the front of the cowl front member 18. An end portion of the rear side wall 18A, which is formed outwardly to run at right angles to the length of the vehicle, i.e., outwardly with respect to the transverse direction of the length of the vehicle, is bent rearwards at right angles to form a vertical flange 18C. The vertical flange 18C is welded, internally at right angles to the length of the vehicle, i.e., with respect to the transverse direction at the length of the vehicle, onto a side wall 24B of a cowlside panel 24, which runs longitudinally.

A vertical flange 20D formed frontwards or upwards along an end portion of the cowl rear member 20, which is formed outwardly with respect to the transverse direction of the length of the vehicle is welded, internally with respect to the transverse direction at the length of the vehicle, onto the side wall 24B of the cowl side panel 24. Accordingly, any water on the cowl rear member 20 does not fall between the cowl rear member 20 and the cowl side panel 24.

A vertical flange 22C formed rearwards or vertically along an end portion of the cowl reinforcement 22, which is formed outwardly with respect to the transverse direction at the length of the vehicle, is welded internally with respect to the transverse direction of the length of the vehicle.

Figure 3:
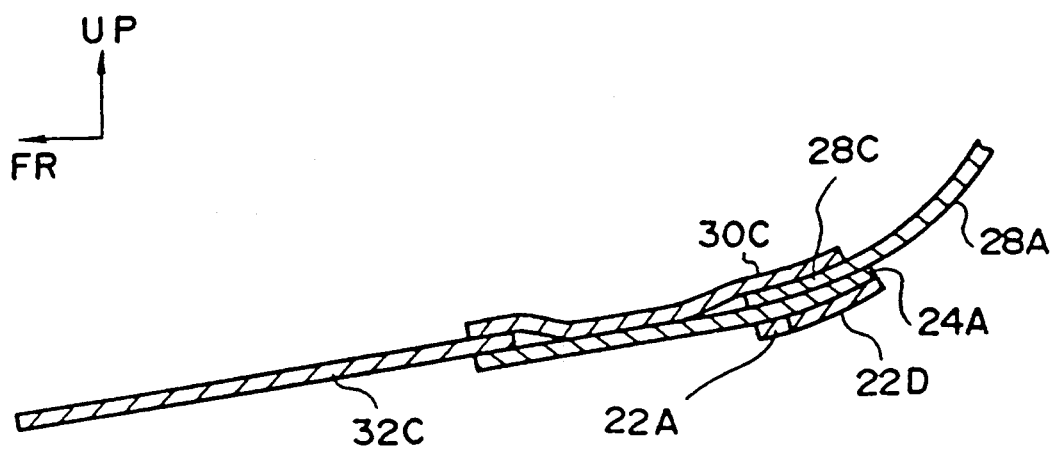
FIG. 3 is a cross-sectional view taken along line 3—3 of FIG. 1.

A front part and central part at an upper end of the cowlside panel 24 are bent inwardly with respect to the transverse direction of the length of the vehicle to produce a flange 24A formed in a gently-sloping and continuous fashion to run longitudinally. The rear end of the flange 24A is bent slightly upwards. As shown in FIG. 3, the end portion of the upper flange 22A at the cowl reinforcement 22, which is formed outwardly with respect to the transverse direction of the length of the vehicle, and the end portion of the upper side 22D of the cowl reinforcement 22, which is formed outwardly to run at right angles to the length of the vehicle and connected continuously to the outer end portion of the upper flange 22A, are welded to the rear end of the flange 24A from the lower side of the cowl reinforcement 22.

Accordingly, rigidity in connection with respect to the transverse direction at the length of the vehicle between the cowl reinforcement 22 and to the cowlside panel 24 is enhanced.

The lower end portion 26A of the front-pillar inner upper member 26, which forms part of the front pillar 25, is welded, externally with respect to the transverse direction of the length of the vehicle, onto a rear end portion 24D at the upper end portion of the cowlside panel 24. A portion other than the lower end portion 26A of the front-pillar inner upper member 26 is in the form of a substantially hat-shaped cross section defining an opening directed outwardly at right angles to the length of the vehicle. Flanges 26B and 26C are formed at the front and rear sides of the portion referred to above.

The front-pillar outer member 28, which forms part of the front pillar 25 and disposed outwardly of the front-pillar inner upper member 26 at right angles to the length of the vehicle, is welded onto the flanges 26B and 26C externally with respect to the transverse direction of the length of the vehicle. Namely, the front-pillar outer member 28 defines a hat shaped cross-section, as seen from upper and lower directions, with an opening directed inwardly at right angles to the length of the vehicle. An upper portion of the front-pillar outer member 28 is inclined rearwards. Flanges 28A and 28B at the inclined portion are welded onto the flanges 26B and 26C respectively of the front-pillar inner upper member 26. Thus, upper portions of the front-pillar inner upper member 26 and the front pillar outer member 28 define a closed cross-section in structure.

The lower end portion of the flange 28A of the front pillar outer member 28 is formed inwardly with respect to the transverse direction of the length of the vehicle in a gently-sloping and continuous fashion along the length of the vehicle so as to form a flange 28C. The flange 28C is welded, from the upper side of the cowlside panel 24, onto the rear portion of the flange 24A of the cowlside panel 24. In addition, each of flanges 28D and 28E corresponding to lower portions of the front-pillar outer member 28 is welded, externally with respect to the transverse direction of the length of the vehicle, onto a rear portion of the side wall 24B of the cowlside panel 24. Accordingly, lower portions of the cowlside panel 24 and the front-pillar outer member 28 define a closed cross-section in the structure.

The upper member rear piece 30 is welded, from the upper side of the front-pillar outer member 28, to the front end portion of the front-pillar outer member 28. The cross section of the upper member rear piece 30 as seen from the front-to-rear direction thereof is in the form of a substantially inverted U shaped frame with an opening directed downwards and a leg 30A formed outwardly to run at right angles to the length of the vehicle extending in a downward side. The rear end portion of the leg 30A is welded, externally with respect to the transverse direction of the length of the vehicle, onto a side wall 28F of the front-pillar outer member 28.

In addition, another leg 30B of the upper rear member 30 has a rear portion which becomes gradually shorter, but does not exist at its rear end portion. A flange 30C is formed inwardly with respect to the transverse direction of the length of the vehicle from the lower end portion of the leg 30B in a gently-sloping and continuous fashion along the length of the vehicle. As shown in FIG. 3, the flange 30C is welded, from the upper side of the front-pillar outer member 28, onto the flange 28C thereof. Thus the flange 30C of the upper member rear piece 30, the flange 28C of the front-pillar outer member 28 and the flange 24A of the cowlside panel 24 are joined together in a gently-sloping and continuous form along the length of the vehicle, so that rigidity in the area where these joint portions are connected is increased.

The rear end portion of the upper member front piece 32 is welded to the front end portion of the upper member rear piece 30. The cross section of the upper member front piece 32 as seen from the longitudinal direction thereof is in the form of an inverted U shaped frame with an opening directed downwardly and a leg 32A formed outwardly with respect to the transverse direction of the length of the vehicle extending in a downward side. The rear end portion of the leg 32A is welded internally with respect to the transverse direction at the length of the vehicle to the front end portion of the leg 30A of the upper rear member 30.

In addition, a flange 32C is formed inwardly with respect to the transverse direction at the length of the vehicle from the lower end portion excluding the front portion of another leg 32B of the upper member front piece 32, in a gently-sloping and continuous form in the direction of the length of the vehicle. As shown in FIG. 3, the rear end portion of the flange 32C is welded between the front end portion of the flange 30C of the upper member rear piece 30 and the flange 24A of the cowlside panel 24.

Accordingly, a ridge line A continuously defines a folded portion on upper end portions of the leg 30B of the upper member rear piece 30 and of the leg 32B of the upper member front piece 32.

On the other hand, the rear portion excluding the rear end portion of the flange 32C is welded from the upper side of the cowlside panel 24 on the flange 24A thereof. Thus, as shown in FIG. 3, no cut-away portion of folded portion exists between the flange 32C of the upper member front piece 32 and the flange 28C of the front-pillar outer member 28, and hence a continuous connection is made therebetween, whereby the rigidity therebetween is enhanced.

The lower end portion of the leg 30A of the upper member rear piece 30 and that of the leg 32A of the upper member front piece 32 are inclined at an angle of substantially 45° outwardly with respect to the transverse direction of the length of the vehicle, thereby forming flanges 30D and 32D respectively. The lower part of the upper member 34, which is to be placed at the bottom of the upper member rear piece 30 and that of the upper member front piece 32 along the length of the vehicle, is welded onto these flanges 30D and 32D. In other words, an end portion of the upper member lower part 34, which is formed outwardly with respect to the transverse direction of the length of the vehicle, is bent downwards at an angle of substantially 45° to form a flange 34A. The flange 34A is then welded to the flange 30D of the upper member rear piece 30 and the flange 32D of the upper member front piece 32 from the bottoms of both the upper member rear piece 30 and the upper member front piece 32.

On the other hand, an end portion of the upper member lower part 34, which is formed inwardly with respect to the transverse direction of the length of the vehicle, is bent in the form of a ridge to form a flange 34B. A rear portion of the flange 34B is welded, externally with respect to the transverse direction of the length of the vehicle, onto the side wall 24B of the cowlside panel 24. Accordingly, the cowlside panel 24, the upper member rear piece 30 and the upper member lower part 34 define a closed cross-section in structure.

In addition, a front portion of the flange 34B of the upper member lower part 34 is welded, externally with respect to the transverse direction of the length of the vehicle, onto a lower end portion of a side wall 36A of a suspension spring support outer side panel 36 forming a cowlside panel together with the cowlside panel 24, which is arranged in front of the cowlside panel 24 along the length of the vehicle. An upper end portion of the side wall 36A of the spring support outer side panel 36 is bent inwardly with respect to the transverse direction at the length of the vehicle so as to form a flange 36D. The flange 36D is then welded to the flange 32C of the upper member front piece 32 from a lower side thereof. Accordingly, the spring support outer side panel 36, the upper member front piece 32 and the upper member lower part 34 define the closed cross-section 46 shown in FIG. 4.

Both end portions of the spring support outer side panel 36, which are formed along the longitudinal direction of the vehicle, are bent inwardly with respect to the transverse direction of the length of the vehicle so as to form flanges 36B and 36C (see FIG. 2). These flanges 36B and 36C are respectively welded to inner peripheral walls 38A and 38B at ends of an opening of the spring support inner side panel 38 having a cross-sectional configuration of an inverted U shape with the opening directed to the outside with respect to the transverse direction of the length of the vehicle.

In addition, both end portions of the flange 38C, which are formed, inwardly of the U shape, at an upper end portion of the spring support inner side panel 38, are welded between both end portions of the flange 36D of the spring support outer side panel 36, which are formed in the longitudinal direction of the flange 36D, and the flange 32C of the upper front member 32. An edge 40A of the spring support upper plate 40, in which a portion formed inwardly with respect to the transverse direction of the length of the vehicle is defined in an inverted U shape, is welded onto the flange 38C from the lower side of the spring support upper plate 40 to form a spring support 41.

Figure 4:
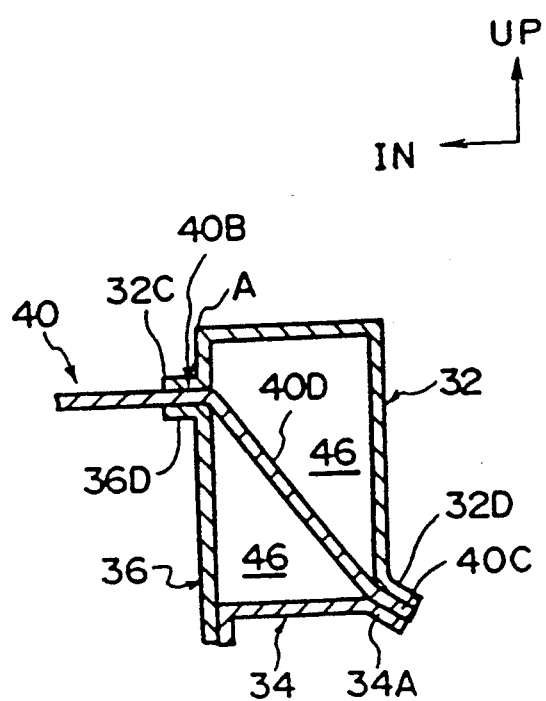
FIG. 4 is a cross-sectional view taken along line 4—4 of FIG. 1.

As shown in FIG. 4, a portion of the spring support upper plate 40, which is formed outwardly with respect to the transverse direction of the length of the vehicle, is diagonally bent downwards to from a bent portion 40D. In addition, the flange 32C of the upper member front piece 32 is welded to the upper side of the bent portion 40B, whereas the flange 36D of the spring support outer side panel 36 is welded to the lower side of the bent portion 40B. An end portion of the spring support upper plate 40, which is formed outwardly with respect to the transverse direction of the length of the vehicle, is provided as a flange 40C and then welded between the flange 32D of the upper member front piece 32 and the flange 34A of the upper member lower part 34.

Accordingly, the bent portion 40D of the spring support upper plate 40, which is formed outwardly with respect to the transverse direction of the length of the vehicle, extends through the closed cross-section 46 defined by the spring support outer side panel 36, the upper member front piece 32 and the upper member lower part 34 to be divided into two regions.

On the other hand, the rear end portion of the flange 38C of the spring support inner side panel 38 is bent upwardly to form a bent portion 38D. The bent portion 38D is then welded, externally with respect to the transverse direction of the length of the vehicle, to the leg 32B of the upper member front piece 32. The distal end of the bent portion 38D is folded outwardly with respect to the transverse direction of the length of the vehicle to form a folded portion 38E. The folded portion 38E is then welded to the upper face 32E of the upper member front piece 32 from the lower side thereof. Further, the rear-side outer peripheral wall of the spring support inner side panel 38 is bent rearwards to form a flange 38F. The flange 38F is then welded, externally with respect to the transverse direction of the length of the vehicle, to the front end portion 24C of the side wall 24B at the cowlside panel 24.

The front end portion of the flange 38C of the spring support inner side panel 38 is bent upwards to form a bent portion 38G. The bent portion 38G is then welded, externally with respect to the transverse direction of the length of the vehicle, to the front end portion of the leg 32B of the upper member front piece 32. In addition, the distal end of the bent portion 38G is folded outwardly with respect to the transverse direction of the length of the vehicle to form a folded portion 38H. The folded portion 38H is then welded to the upper face 32E of the upper front member 32 from the lower side thereof.

The front side outer peripheral wall of the spring support inner side panel 38 is bent frontwards to form a flange 38J. The flange 38J is then welded, externally with respect to the transverse direction of the length of the vehicle, to the rear end portion 42B of the side wall 42A at the front apron 42.

In addition, the front end portion of the cowl front member 18 is bent upwards to form a bent portion 18D as a front end portion formed in the longitudinal direction of the vehicle. The upper end of the bent portion 18D is bent frontwards to form a horizontal flange 18E. The bent portion 18D is welded to the side wall 38K of the spring support inner side panel 38 from the rear side thereof. The flange 18E of the cowl front member 18 is then welded on the rear portion of the flange 38C of the spring support inner side panel 38 from the upper side thereof.

Accordingly, the cowl front member 18 connections are subjected to shearing forces in up and-down and right and left directions of the spring support inner side panel 38.

The end portion of the cowl front member 18, which is formed outwardly with respect to the transverse direction of the length of the vehicle, is bent upwards or rearwards to form a vertical flange 18F. The vertical flange 18F is then welded, internally with respect to the transverse direction of the length of the vehicle, to the side wall 24B of the cowlside panel 24. A recess 44 is defined downwards in the central portion of the cowl front member 18 with respect to the transverse direction of the length of the vehicle. Thus, water falling into the opening cowl 16, i.e., on the cowl front member 18 and the cowl rear member 20, is delivered to a lower part of the vehicle through the recess 44 to be discharged outside the vehicle.

A description will now be made on the operation of the present embodiment.

As shown in FIG. 3, the respective flange 24A, 28C, 30C and 32C of the cowlside panel 24, the front-pillar outer member 28, the upper member rear piece 30 and the upper member front piece 32 are formed along the length of the vehicle in a gently sloping and continuous form. A cut-away portion or folded portion, on which stress is concentrated, is not provided at these flanges 24A, 28C, 30C and 32C.

Accordingly, rigidity between the respective flanges of the cowlside panel 24, the front-pillar outer member 28, the upper member rear piece 30 and the upper member front piece 32 is improved, so that rigidity between the front pillar 25 and the spring support 41 can be enhanced.

In the present embodiment as shown in FIG. 1, the ridge line A at the upper end portion of the leg 30B of the upper member rear piece 30 and that of the leg 32B of the upper member front piece 32 is defined continuously in the longitudinal direction of the vehicle. Therefore, rigidity of respective members for the upper member rear piece 30 and the upper member front piece 32, which are provided up-and-down and left and right directions, is enhanced and rigidity in portions where the upper member rear piece 30 and the upper member front piece 32 are joined together is also improved. It is thus possible to further improve rigidity between the front pillar 25 and the spring support 41, thereby making it possible to enhance control stability and the vibration-proof properties of the vehicle.

As depicted in FIG. 4, the spring support upper plate 40 passes through a joint face between the flange 36D of the spring support outer side panel 36 and the flange 32C of the upper member front piece 32 and extends through the closed cross-section 46 defined by the spring support outer side panel 36, the upper member front piece 32 and the upper member lower part 34. Accordingly, rigidity where the spring support outer side panel 36 and the spring support 41 for the upper member front piece 32 are joined together can be enhanced because no cut-away portion is formed in a structure having a closed cross-section.

In addition, since the flange 38F of the spring support inner side panel 38 has been welded, externally with respect to the transverse direction of the length of the vehicle, onto the front end portion 24C of the side wall 24B at the cowlside panel 24 in the present embodiment, the shearing connection is made with respect to loads applied upwards and downwards to the spring support 41, so that rigidity between the cowlside panel 24 and the spring support 41 is enhanced and controllability, vibration-resistance, etc. is improved.

As shown in FIG. 2, the vertical flanges 18C, 18F of the cowl front member 18, the vertical flange 20D of the cowl rear member 20 and the vertical flange 22C of the cowl reinforcement 22 respectively are welded, internally with respect to the transverse direction of the length of the vehicle, to the cowlside panel 24. In addition, the bent portion 18D of the cowl front member 18 is welded on the side wall 38K of the spring support inner side panel 38 from the rear side thereof, whereas the horizontal flange 18E of the cowl front member 18 is welded on the rear portion of the flange 38C of the spring support inner side panel 38 from the upper side thereof.

Accordingly, the cowl front member 18 connections are subjected to the shearing forces in the vertical and right and left directions of the spring support inner side panel 38.

It is therefore possible to improve rigidity in the portions where the spring support 41 and each of the members referred to above are joined together, without providing reinforcing.

Having now fully described the invention, it will be apparent to those skilled in the art that many changes and modifications can be made without departing from the spirit or scope of the invention as set forth herein.

What is claimed is:

1. A cowlside joint structure for use on a vehicle, comprising:
 a cowlside panel disposed at an outer end of a cowl of a vehicle, including a first flange formed along an upper edge of said cowlside panel and extending substantially parallel to the longitudinal axis of the vehicle, said first flange being formed by said upper edge of said cowlside panel being bent transversely inward, towards a longitudinal center of the vehicle;

an upper member disposed at the outer end of said cowl of the vehicle, including a second flange formed along the length of said upper member by the upper edge thereof being bent transversely inward towards the longitudinal center of the vehicle, such that said second flange lies substantially in line with said first flange of said cowlside panel; and a front pillar disposed substantially vertically on an outer side of said cowlside panel, including a third flange formed by an edge of an upper inclined portion being bent transversely inward towards the longitudinal center of the vehicle, such that said third flange lies substantially in line with said first and second flanges, wherein said first, second, and third flange are all fixedly joined together.

2. A cowlside joint structure according to claim 1, wherein said third flange is held by said first and second flanges, and joining of said third flange to said first flange and said second flanges is accomplished by means of a holding portion formed of said first and second flanges.

3. A cowlside joint structure according to claim 2, wherein said third flange is formed such that a portion thereof to be held is bent upwards from a front side to a rear side of the flange, and said holding portion for holding said third flange to said first and second flanges is also bent in the same manner as said portion of said third flange to be held.

4. A cowlside joint structure according to claim 2, further comprising a cowl reinforcement having a substantially U-shaped cross-section taken along the longitudinal axis of the vehicle, with an opening directed towards the front of the vehicle provided at the rear side of said cowl of the vehicle, and having an outer end portion which extends towards said cowlside panel so as to be joined thereto.

5. A cowlside joint structure according to claim 3, wherein said upper member comprises an upper member front piece located at a front end of the vehicle cowl and an upper member rear piece located at a rear end of the vehicle cowl, and said second flange is provided on said upper member rear piece.

6. A cowlside joint structure according to claim 5, wherein said holding of said third flange by said first and second flanges is accomplished by means of portions of both said first and second flanges, which are formed on the rear ends of said cowlside panel and said upper member rear piece, respectively.

7. A cowlside joint structure according to claim 6, wherein said upper member front piece includes a fourth flange, which is formed by the top edge thereof being bent transversely inward toward the longitudinal center of the vehicle, and which extends along the length of said upper member front piece; and wherein said fourth flange is held by means of portions of both said first and second flanges, which are formed at the front ends of said cowlside panel and said upper member rear piece, respectively, and wherein said fourth flange is joined together with both of said first and second flanges.

8. A cowlside joint structure according to claim 7, wherein the joining of said first flange of said cowlside panel to said second flange of said upper member is accomplished by means of a holding portion formed of longitudinally intermediate portions of said first flange and said second flange.

9. A cowlside joint structure according to claim 1, wherein said cowl of the vehicle has an overall concave shape opening upward, and said joint structure further comprises two horizontal flanges formed at a front edge and a rear edge of said cowl of the vehicle, and a substantially vertical flange provided at the outer end of said cowl of the vehicle, said flanges being formed by bending the edges of said cowl of the vehicle substantially at right angles with respect to a transverse axis of the vehicle so as to extend toward a front of said vehicle, and wherein said cowl of the vehicle and said cowlside panel are joining together through said vertical flange, and wherein said cowlside joint structure comprises a spring support positioned at the front end of said cowl of the vehicle having an upper rear edge joined to said front horizontal flange from an underside thereof.

10. A cowlside joint structure according to claim 1, wherein said cowlside panel and said upper member define a structure having a closed cross-section taken at right angles to the length of the vehicle when said first and second flanges are in a joined state, and wherein said second flange is formed so as to extend downwards at substantially right angles from an approximately horizontal wall portion of said upper member, and wherein said cowlside joint structure further comprises a spring support plate which extends into and through said closed cross-section structure and which includes a surface positioned in the vicinity of the front end of said cowl of the vehicle, to which said first flange and said second flange are joined.

11. A cowlside joint structure for use on a vehicle, comprising:

a cowlside panel disposed at an outer end of a cowl of a vehicle, including a first flange formed along an upper edge of said cowlside panel and extending substantially parallel to a longitudinal axis of the vehicle, said first flange being formed by said upper edge of said cowlside panel being bent transversely inward, towards a longitudinal center of the vehicle;

an upper member disposed at the outer end of said cowl of the vehicle, including a second flange formed along the length of said upper member by the upper edge thereof being bent transversely inward towards the longitudinal center of the vehicle, such that said second flange lies substantially in line with said first flange of said cowlside panel; and a front pillar disposed substantially vertically on an outer side of said cowlside panel, including a third flange formed by an edge of an upper inclined portion being bent transversely inward towards the longitudinal center of the vehicle, such that said third flange is joined to said first flange from a lower side thereof and to said second flange from an upper side thereof.

12. A cowlside joint structure according to claim 11, wherein said third flange is held by said first and second flanges, and joining of said third flange to said first and second flanges is accomplished by means of a holding portion formed of said first and second flanges.

13. A cowlside joint structure according to claim 12, wherein said third flange is formed such that the portion thereof to be held is bent upwards from the front side to the rear side of the third flange, and said holding portion for holding said third flange to said first and second flanges is also bent in the same manner as said portion of said third flange to be held.

14. A cowlside joint structure according to claim 12, further comprising a cowl reinforcement having a substantially U-shaped cross-section taken along a longitudinal axis of the vehicle, with an opening directed towards a front of the vehicle provided at the rear side of said cowl of the vehicle, and having an outer end portion which extends towards said cowlside panel so as to be joined thereto.

15. A cowlside joint structure according to claim 13, wherein said upper member comprises an upper member front piece located at a front end of the vehicle cowl and an upper member rear piece located at a rear end of the vehicle cowl, and said second flange is provided on said upper member rear piece.

16. A cowlside joint structure according to claim 15, wherein said holding of said third flange by said first and second flanges is accomplished by means of portions of both said first and second flanges, which are formed on the rear ends of said cowlside panel and said upper member rear piece, respectively.

17. A cowlside joint structure according to claim 16, wherein said upper member front piece includes a fourth flange, which is formed by the top edge thereof being bent transversely towards the longitudinal center of the vehicle, and which extends along the length of said upper member front piece, and wherein said fourth flange is held by means of a portion of said first flange located at a lower end thereof with respect to a vertical axis of the vehicle, said portion being formed on the front end of the cowlside panel and a portion of said second flange located at the front end thereof with respect to the longitudinal axis of the vehicle, said portion being formed on the front end of the upper member rear pieces, and wherein said fourth flange is joined together with both of first and second flanges.

18. A cowlside joint structure according to claim 17, wherein the joining of said first flange of said cowlside panel to said second flange of said upper member is accomplished by means of a holding portion formed of longitudinally intermediate portions of said first and second flanges.

19. A cowlside joint structure according to claim 11, wherein said cowl of the vehicle has an overall concave shape opening upward, and said joint structure further comprises two horizontal flanges formed at a front edge and a rear edge of said cowl of the vehicle, and a substantially vertical flange provided at the outer end of said cowl of the vehicle, said flanges being formed by bending the edges of said cowl of the vehicle substantially at right angles with respect to a transverse axis of the vehicle so as to extend toward a front of said vehicle, and wherein said cowl of the vehicle and said cowlside panel are joined together through said vertical flange, and said cowlside joint structure comprises a spring support positioned at the front end of said cowl of the vehicle having an upper rear edge joined to said front horizontal flange from an underside thereof.

20. A cowlside joint structure according to claim 11 wherein said cowlside panel and said upper member define a structure having a closed cross-section taken at right angles to the length of the vehicle when said first and second flanges are in a joined state, and wherein said second flange is formed so as to extend downwards at substantially right angles from an approximately horizontal wall portion of said upper member, and wherein said cowlside joint structure further comprises a spring support plate which extends into and through said closed cross-sectional structure and which includes a surface positioned in the vicinity of the front end of said cowl of the vehicle, to which said first and second flanges are joined.

* * * * *

UNITED STATES PATENT AND TRADEMARK OFFICE
CERTIFICATE OF CORRECTION

PATENT NO. : 5,052,742
DATED : October 1, 1991
INVENTOR(S) : Shigeru AKOSHIMA and Hisashi OGAWA It is certified that error appears in the above-identified patent and that said Letters Patent is hereby corrected as shown below:

On the Title page, the second inventor's name should read as follows:

[75] Inventors: Shigeru Akoshima, Toyota;
Hisashi Ogawa, Okazaki, both of Japan

Signed and Sealed this

Seventh Day of June, 1994

Attest:

BRUCE LEHMAN

Attesting Officer

Commissioner of Patents and Trademarks